(12) United States Patent
Sloan

(10) Patent No.: US 11,704,377 B2
(45) Date of Patent: *Jul. 18, 2023

(54) INCENTIVIZED ELECTRONIC PLATFORM

(71) Applicant: Fan Label, LLC, Birmingham, MI (US)

(72) Inventor: Jeffrey M. Sloan, Birmingham, MI (US)

(73) Assignee: Fan Label, LLC, Birmingham, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,126

(22) Filed: Jul. 15, 2022

(65) Prior Publication Data

US 2022/0358174 A1 Nov. 10, 2022

Related U.S. Application Data

(63) Continuation-in-part of application No. 17/228,060, filed on Apr. 12, 2021, now Pat. No. 11,392,656, (Continued)

(51) Int. Cl.
*G06F 16/9535* (2019.01)
*G06F 16/61* (2019.01)
(Continued)

(52) U.S. Cl.
CPC .......... *G06F 16/9535* (2019.01); *G06F 16/61* (2019.01); *G06F 16/638* (2019.01); *G06F 16/9536* (2019.01); *G06F 16/9537* (2019.01)

(58) Field of Classification Search
CPC .... G06F 16/61; G06F 16/638; G06F 16/9536; G06F 16/9537
See application file for complete search history.

(56) References Cited

U.S. PATENT DOCUMENTS

| 7,921,440 B1 | 4/2011 | Koide et al. |
| 8,095,424 B2 | 1/2012 | Eglen et al. |

(Continued)

OTHER PUBLICATIONS

Larimer, Daniel et al., Steem, An Incentivized, Blockchain-based Social Media Platform, 2012, 44 pages.

(Continued)

*Primary Examiner* — Angelica Ruiz
(74) *Attorney, Agent, or Firm* — Brooks Kushman P.C.

(57) ABSTRACT

A data structure embodied on a computer-readable medium is disclosed. The data structure may include a database schema for arranging a competition among associated users in a structured query language (SQL) database. The database schema may include a grouping schema and a competition schema. The grouping schema may identify one or more associated contestants. The grouping schema may receive one or more inputs from a host contestant to identify and associate the one or more associated contestants. The competition schema may include a plurality of contests. Each contest may have relational data tables configured to receive selections of songs, albums, and/or artists from the contestants, and reward points based on those selections. The points may be rewarded to each contestant based on their corresponding selections. The sum of the points for each contestant may be accumulated to determine a score. The points may be rewarded based on one or more activity tracking parameters. The database schema may also employ an application. The application may provide access to the plurality of selections and scores in the SQL database. The application may also manage the contestants, the plurality of selections, the one or more activity tracking parameter and the scores for each of the contestant.

20 Claims, 18 Drawing Sheets

Related U.S. Application Data which is a continuation of application No. 15/637,844, filed on Jun. 29, 2017, now Pat. No. 11,023,543.

(51) Int. Cl.
*G06F 16/638* (2019.01)
*G06F 16/9537* (2019.01)
*G06F 16/9536* (2019.01)

(56) References Cited

U.S. PATENT DOCUMENTS

| | | | |
|---|---|---|---|
| 8,380,710 | B1 | 2/2013 | Finne et al. |
| 8,678,930 | B2 | 3/2014 | Gabrail et al. |
| 8,756,224 | B2 | 6/2014 | Dassa et al. |
| 9,162,107 | B2 | 10/2015 | Aminzade |
| 11,459,245 | B2 * | 10/2022 | Kleinguetl ................. C02F 1/40 |
| 2006/0008256 | A1 | 1/2006 | Khedour et al. |
| 2007/0191102 | A1 * | 8/2007 | Coliz ...................... A63F 13/12 |
| | | | 463/42 |
| 2008/0032723 | A1 | 2/2008 | Rosenberg |
| 2008/0215420 | A1 | 9/2008 | Angelica |
| 2009/0063511 | A1 | 3/2009 | Myers et al. |
| 2009/0070331 | A1 | 3/2009 | Silman |
| 2009/0277322 | A1 | 11/2009 | Cai et al. |
| 2009/0288118 | A1 | 11/2009 | Chang |
| 2010/0169204 | A1 | 7/2010 | Sippy et al. |
| 2011/0055223 | A1 | 3/2011 | Elmore et al. |
| 2011/0225121 | A1 | 9/2011 | Cooper et al. |
| 2012/0011129 | A1 | 1/2012 | van Zwol et al. |
| 2013/0073400 | A1 | 3/2013 | Heath |
| 2013/0073473 | A1 | 3/2013 | Heath |
| 2013/0191399 | A1 | 7/2013 | Tocaben et al. |
| 2013/0218862 | A1 | 8/2013 | Ghosh et al. |
| 2013/0117063 | A1 | 10/2013 | Nugent et al. |
| 2014/0136554 | A1 | 5/2014 | Moradi et al. |
| 2014/0162741 | A1 | 6/2014 | Diskin et al. |
| 2014/0278986 | A1 | 9/2014 | Rouse et al. |
| 2016/0117063 | A1 | 4/2016 | Fuller |
| 2016/0149956 | A1 | 5/2016 | Birnbaum et al. |
| 2018/0018712 | A1 | 1/2018 | Walden et al. |

OTHER PUBLICATIONS

Pfeiffer, Joseph, III et al., Incentivized Sharing in Social Networks, VLDB Workshop on Online Social Systems (WOSS), 2012, 6 pages.

Mcnew, Sarah, Incentivize Your Fans: A New Approach To Social Media Fans, http://MY.SOCIAL TOASTER.COM, Jun. 11, 2014, 3 pages.

https://fandistro.com/releasing/, A FanDistro Campaign Will Get Your Video Shared More, Apr. 5, 2017, 4 pages.

www/http://My.SocialToaster.com, How It Works, Learn How to Turn Your Fans into Superfans, 2017, 3 pages.

* cited by examiner

FIG. 15

INCENTIVIZED ELECTRONIC PLATFORM

CROSS-REFERENCE TO RELATED APPLICATION

This application is a continuation-in-part of U.S. application Ser. No. 17/228,060 filed Apr. 12, 2021 and issued on Jul. 19, 2022 as U.S. Pat. No. 11,392,656, which is a continuation of U.S. application Ser. No. 15/637,844 filed Jun. 29, 2017 and issued on Jun. 1, 2021 as U.S. Pat. No. 11,023,543, the disclosure of which is incorporated herein by reference in its entirety.

TECHNICAL FIELD

This disclosure relates to an incentivized electronic platform.

BACKGROUND

Games may be used to improve socialization and activity among groups or associations. As groups and association sizes grow, technical solutions may be used to orchestrate gameplay and tally scores. Large-scale games may cause technical failures in game regulation infrastructure or impose large overhead costs. Technical improvements to game regulation and point systems may reduce such costs and processing requirements. Additionally, the use of these games on mobile devices may further restrict the processing power available to facilitate the games.

SUMMARY

A data structure embodied on a computer-readable medium having a database schema for arranging a competition among associated users (e.g., friends) is disclosed. In a refinement, the database schema may employ a structured query language (SQL) database. The database schema may include a grouping schema, which may identify one or more associated contestants of a competition. The grouping schema may receive one or more inputs from a host contestant to identify the one or more associated contestants and associate them with the competition. The database schema may also include a competition schema including a plurality of contest. Each contest may have relational tables to receive selections from contestants and reward points based on those selections. In a refinement, each selection may be a song, album, and/or artist. The points rewarded to each contestant may be based on their corresponding selection(s) and one or more activity tracking parameters. The sum of the points rewarded to a contestant may be accumulated to determine a contestant score. The database schema may also employ an application configured to access and manage the contestants, the plurality of selections, the one or more activity tracking parameters, and the scores for each contestant in the SQL database.

In a refinement, the activity tracking parameters may include at least a stream count, popularity, impressions, views, contestant promotions, shares, and purchases.

An incentivized electronic platform is also disclosed. The platform may include at least one processor including a computer having a central processing unit (CPU) and memory. The CPU may execute machine instruction and the memory may store machine instructions to be executed by the CPU. The instructions may implement the logic that transmits one or more invitation notifications for a competition to one or more user transceivers, transmits contests to the one or more user transceivers, receives the selections of the contests from the contestants, rewards points based on the selections, and rank the contestants. Upon receiving the one or more invitation notifications, one or more users may join the competition as contestants. For each contest, the contestants may each select a song, album, and/or artist via the one or more user transceivers. The points rewarded to each contestant may be based on the corresponding selections. Each contestant may have a score accumulated from the rewarded points of each contest based on the selections in that contest. The ranking may be based on the score.

In a variation, a host contestant may initiate the transmission of the invitation notification by identifying the one or more contestants. In a refinement, the contestants are displayed and ranked by score on a screen accessible via the one or more user transceivers. In one or more embodiments, the contest may be displayed in a lobby screen associated with the competition. In a refinement, the lobby screen may also include an activity record of contestant activities within the competition. The lobby screen may also include a contest timer countdown displaying a time remaining in the competition. In one or more embodiments, the competition may be identified by a unique competition code such that an unassociated user may join the competition as a contestant with the unique competition code. In a refinement, the competition has a start time and the score for each of the contestants is zero at the start time and accumulates thereafter. The points may be rewarded based on an activity tracking algorithm.

In one or more embodiments, an incentivized electronic platform is disclosed. The platform includes at least one processor including a computer having a CPU and memory. The memory may store machine instructions to be executed by the CPU. When executed the instruction may execute logic. The logic may include receiving a prompt from a host contestant to initiate a competition, transmitting a screen to a host contestant for receiving competition information, receiving contestant information for identifying one or more contestants, and transmitting a competition invite and/or unique competition code to the one or more contestants such that the contestants join the competition.

In a refinement, the prompt may be engaging a digital button. In a variation, the competition includes a start date and a competition duration. In another refinement, the competition information may include a competition prize.

Another incentivized electronic platform is disclosed. The platform including a processor including a computer having a CPU for executing machine instructions and memory for storing machine instructions. In one or more embodiments, the instructions may execute functions including generating a music label profile, displaying a plurality of contests, displaying a number of selection prompts from a digital register of, for example, music, receiving a selection via the selection prompts, and rewarding points based on the selection. The music label profile may be associated with a specific user and include a cumulative score. The plurality of contest may be displayed on a screen transmitted to a mobile device of the user. The selection prompts may be transmitted to the mobile device via a selection screen. The selection prompts may represent songs, albums, and/or artists. Thus, in essence the user may be selecting a song, album, and/or artist. The points rewarded may be added to the cumulative score.

In a variation, the selection may represent a song. In a refinement, the machine instructions may further include transmitting a second selection screen to a mobile device, receiving a second selection. The second selection screen may correspond to a second contest of the plurality of contest. The second selection may represent a different song, album, and/or artists than the first selection. Additional points may be rewarded based on the second selection and may be added to the cumulative score for the music label profile. In a refinement, an indication of the cumulative score may be displayed. In one or more embodiments, the first and second selections may represent songs.

BRIEF DESCRIPTION OF THE DRAWINGS

FIG. 15 is a display screen of a GUI including a digital content item creator dashboard.

DETAILED DESCRIPTION

Figure 1:
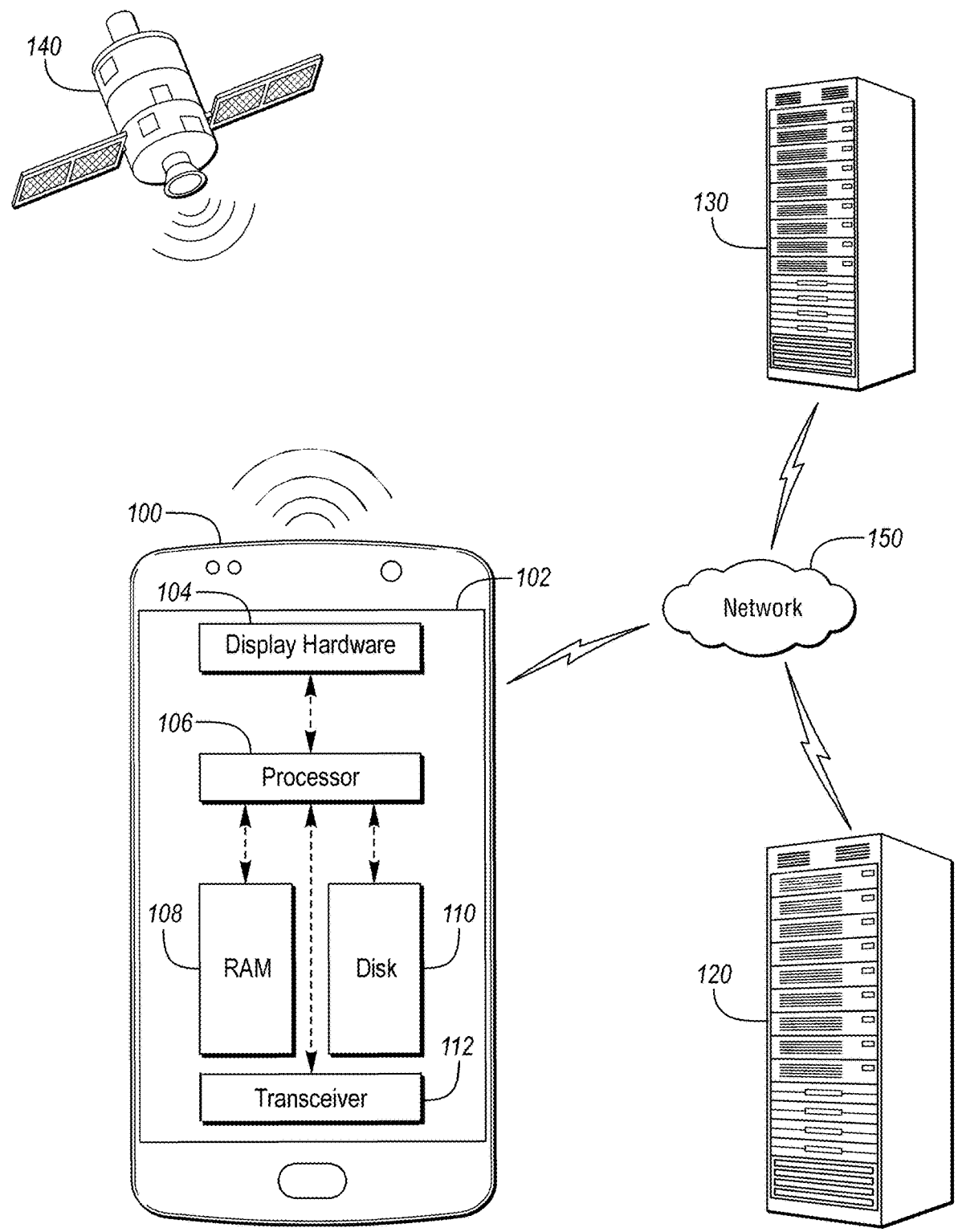
FIG. 1 is a computer system for improving the organization and point retention for an electronic game.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Processing and memory constraints necessitate efficient gaming platforms, architectures, and data schemas to allow interoperability with mobile devices. The existing computer game systems and point accumulators do not provide adequate technical solutions that provide efficient gaming platforms, architectures and data schemas. Mobile devices may have limited processing capabilities, memory availability, and data transmission capabilities. Movement from high-performance gaming rigs to mobile devices has increased the gravity of deficient data structures and communication methods.

The following proposed gaming systems have failed to provide adequate technical solutions to these acute problems.

U.S. Pat. No. 8,678,930, to Gabrail, discloses a fantasy league management system including one or more reality factors, equity lines, luxury taxes, or revenue sharing policies. The fantasy league management system discloses generic databases for storing and maintaining data. Gabrail, however, does not attempt to technically improve the association of data within the system or improve data structures and components necessary for fantasy league management. Gabrail attempts to apply computer methods to a well-known fantasy league practice, instead of a technical improvement to computers processing fantasy league parameters.

U.S. Pub. No. 2013/0191399A1, to Tacoben, discloses an inadequate content distribution system. The Tacoben system and method provides a generic "rotational database" structure. The Tacoben system does not provide technical improvement data structures to reduce processing, transmission, and memory usage of mobile devices and backend servers. Tacoben does not provide an improvement to computer functionality itself such as improving data structures required to maintain and process digital content.

U.S. Pub. No 2014/0162741A1, to Diskin, discloses a non-technical improvement to a fantasy league system for allocating points to a fantasy team. Diskin fails to address technical aspects necessary to improve the digital computer system. The fantasy league system of Diskin does not address specific data structures necessary to meet mobile device constraints.

On the other hand, the incentivized electronic platform, the computer system, the computer-readable medium, and the database signature components and parts described herein provide a non-abstract, technological improvement over the previous methods. These technological improvements are rooted in an incentivized data structure having a digital user ranking schema, and an incentivized results schema. The digital user ranking schema and the incentivized results schema are used by an incentivized electronic platform approach to access and manage provided digital content items in a SQL database.

According to one embodiment, a data structure embodied on a computer-readable medium may include a database schema for accessing and managing incentivized electronic platform data. Data stored in the schema may include digital content items or referential information to the digital content items. Each of the digital content items may be identified by a unique identifier. The unique identifier may be assigned to each digital content item using a hash mechanism (e.g., MD5). The unique identifier may also include a first portion to identify an original work and a second portion to identify a derivative work. The unique identifier may be used to organize the schema.

The schema may also include ranking information. The ranking information may be used to generate digital registers, including a subset of digital content items based on popularity or association. The schema is an innovative logical model for maintaining game data and information. An additional digital register may include a subset of unranked digital content items. The schema may include a column or identifier for recognizing unranked digital content items (e.g., null).

The ranked and unranked digital registers may be sent to a user through a network (e.g., internet) for selection such that the user can participate in a game. The user may select from the digital registers to form a digital user ranking. The digital user ranking may include digital content items from both registers. After the digital user ranking is determined, it is compared against other digital user rankings. The comparison uses activity tracking parameters to determine points (i.e., virtual credit) associated with each digital user ranking. For example, an activity tracking parameter may be the popularity of the digital content item. If the digital content item is a song, points may be assigned to the digital user ranking based on the improvement of the song along the charts.

Referring to FIG. 1, a mobile device 100 is shown. The mobile device 100 may include a display 102. The display 102 may be an LCD, OLED or another implement. The display 102 may be driven by display hardware 104, which may include processors or drivers for illuminating the display 102. The display hardware 104 may be connected to a processor or processors 106. The processors 106 are associated with memory 108 and storage 110. The mobile device 100 may also include a transceiver 112 connected to the processor 106 for sending and receiving digital register data, digital user rankings, game information, game scores, and other information required by the game. For example, the game may have a location or region component to localize players such that players compete against similarly situated contestants. The localization component may use GPS 140 or cellular towers to locate and track the mobile device 100 over time. The device 100 may be associated with other nearby devices to form competitive groups. The players may be otherwise associated. For example, the players may be associated by school, fraternity, or sports teams.

Figure 16:
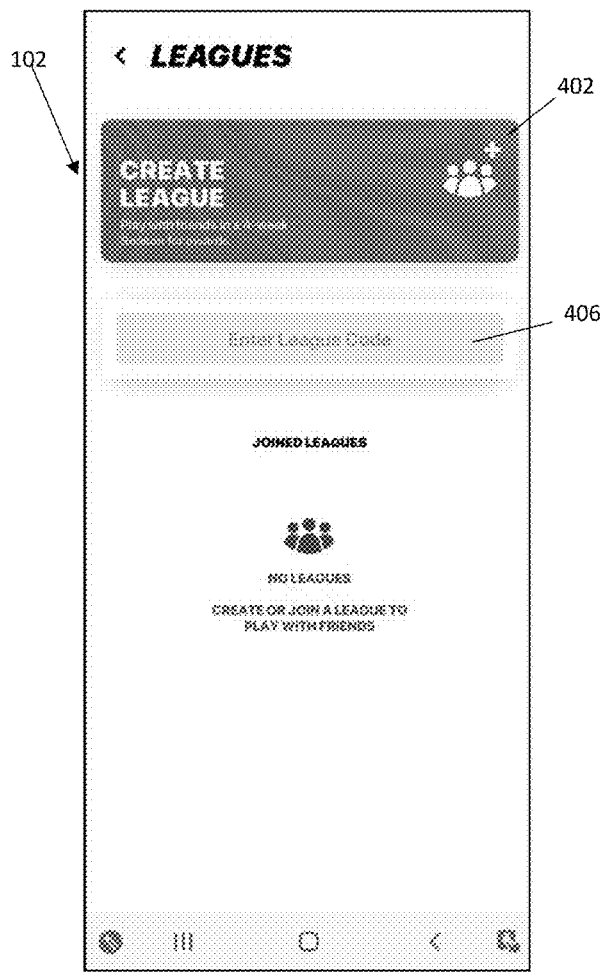
FIG. 16 is a display screen of a GUI including a prompt to initiate a competition between associated contestants.

In a variation, the players may be associated by personal relationships (e.g., the players may be friends and/or family). In one or more embodiments, the schema may include a grouping schema for forming the competitive groups. In a refinement, the grouping schema may be populated by a host contestant. The host contestant may initiate a competition between associated contestants by engaging a prompt 402 such as a (digital or virtual) button on a screen of the GUI 102 on the display of, for example, a user transceiver such as the mobile device, as shown in FIG. 16.

Figure 17:
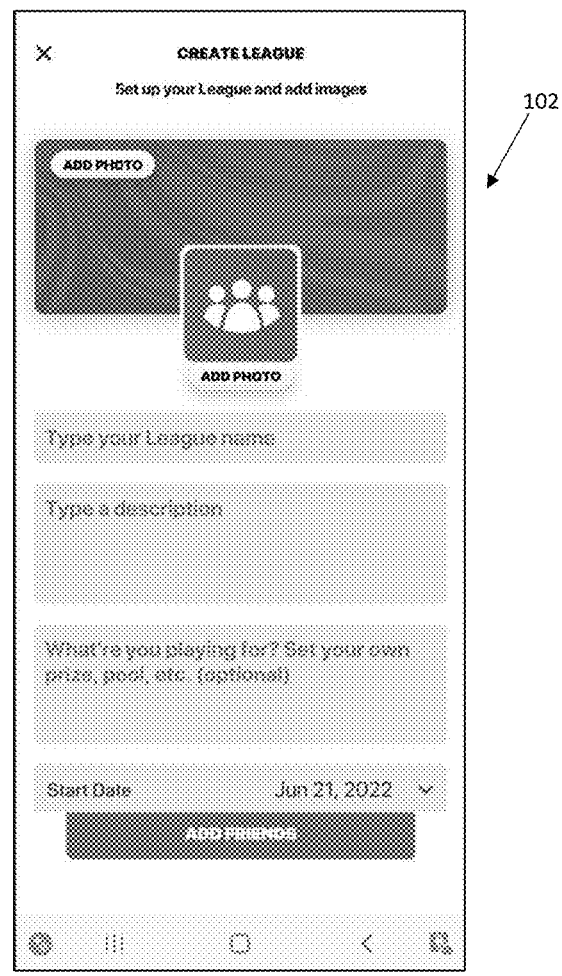
FIG. 17 is a display screen of a GUI for receiving competition information inputs.
Figure 18:
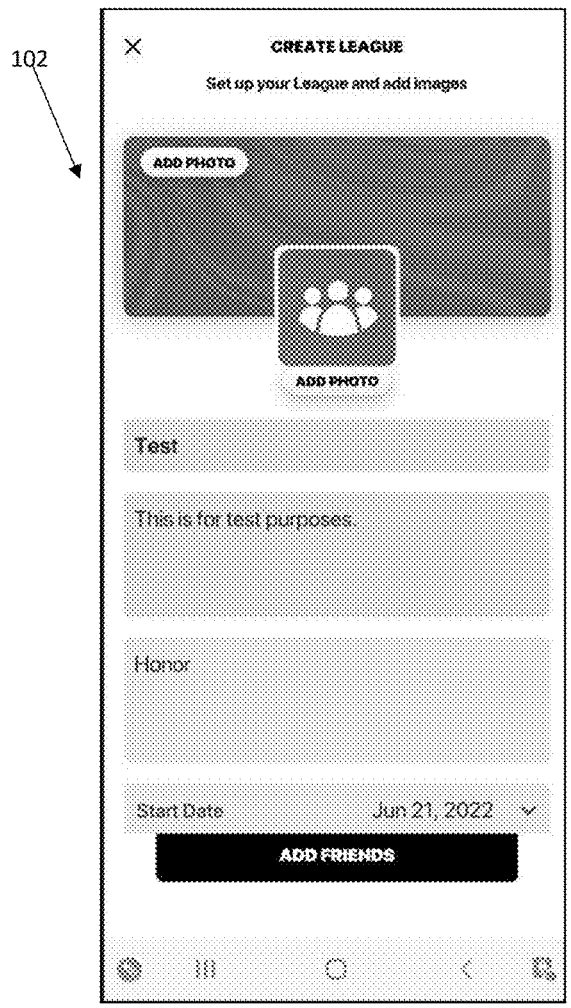
FIG. 18 is a display screen of a GUI with competition information inputs.
Figure 19:
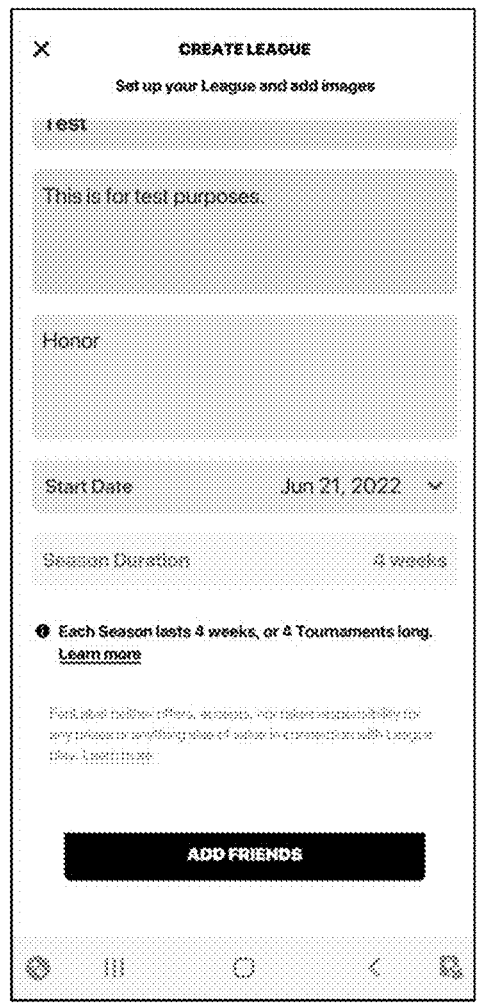
FIG. 19 is a continuation of the display screen of FIG. 18.
Figure 20:
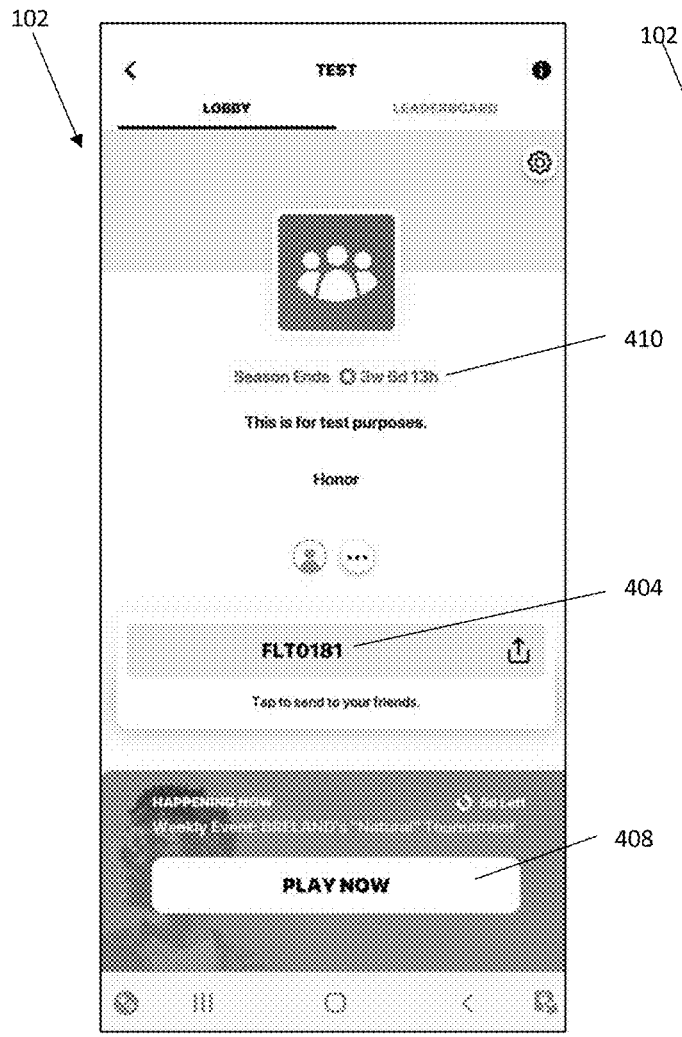
FIG. 20 is a display screen of a GUI of a lobby for a competition.

Upon receiving the prompt, the schema may initiate a competition, as shown in FIG. 20. The schema may transmit a screen to the host contestant for receiving competition information such as a competition image, a competition name, a competition description, a competition prize, a start date/time, and a duration (i.e., end date/time), as shown in FIGS. 17-19. The competition information may be received after engaging the prompt 402 to create a new competition.

The schema may also receive contestant information for identifying the one or more contestants such as from the host contestant.

Once identified the schema may transmit a competition invitation or invite to the one or more contestants such that they join the competition. For example, the schema may employ an application on the user transceiver such that an invitation notification and/or invite joins the one or more users into the competition. Alternatively, or in combination, the schema may assign a unique competition code 404 for the competition. The one or more unassociated users may join the competition as contestants with the unique competition code 404. For example, the application may have an entry box 406 for inputting the unique competition code 404, as shown in FIG. 16.

After the private competition with the competitive group is established, the schema may coordinate the grouping schema with a competition schema. The competition schema may include and provide a contestant a plurality of contests such as by transmitting the contests to the one or more user transceivers of the contestants. Each contest may allow one or more contestants to make a selection via a corresponding user transceiver. The selection may represent a song, album, artist, and/or music video. Relational tables may be configured to receive selections of songs, albums, artists, and/or music video from the contestants, and reward points based on the selections. After receiving one or more selections, the points may be rewarded to each contestant based on the corresponding selections and/or activity tracking parameters of those selections. The sum of the rewarded points may be calculated to determine/assign a score for each contestant. The schema may also rank the contestants based on the score.

Figure 21:
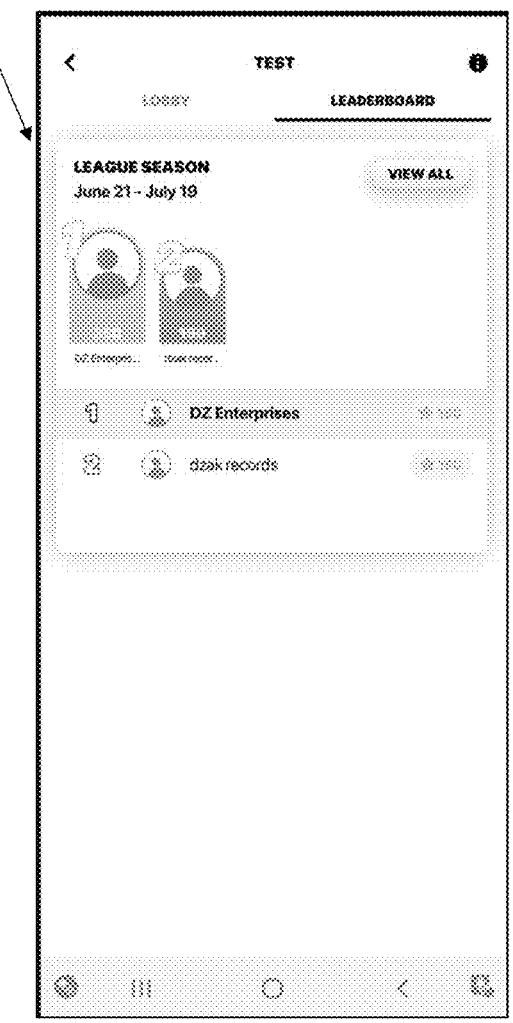
FIG. 21 is a display screen of a GUI of a leaderboard for a competition.

Alternatively, a computer application may be employed. In a refinement, the schema may employ one or more SQL databases for storing the information and executing the application. The application may access and/or manage the contestants, the plurality of selections, the one or more activity tracking parameters, and/or the scores. For example, the application may display a lobby screen for the competition, as shown in FIG. 20, where the one or more contests 408 (e.g., plurality of contests) are displayed. The lobby screen may also display a countdown timer 410 depicting the time remaining in the competition. A leaderboard screen, as shown in FIG. 21, may also be available in the application. The leaderboard screen may display the ranking of contestants based on their scores. In a refinement, the displayed ranking may be provided in real time. In a refinement, each user may begin the competition with zero point at the start of the competition (i.e., start date/time) and thereafter the score may accumulate based on the points rewarded from each contest.

The mobile device 100 may be configured to transmit and receive data through the internet 150. The internet 150 may be reached through cellular towers, satellite or ad-hoc networks. The mobile device 100 may be connected with a backend server 120. The backend server 120 may serve as the main repository for data and information associated with the game. The backend server 120 may include a data store and processing components to store digital content items and references, calculate scores associated with digital user rankings, track activity parameters to determine the score, and otherwise facilitate the game. The backend server 120 and mobile device 100 may be connected with a third-party fingerprinting server 130. The third-party fingerprinting server 130 may determine the unique identifiers associated with original digital content items and derivative digital content items. It should be appreciated that any combination of servers 20, 130 and mobile devices 100 may facilitate the game. For example, the game may be operated entirely on one device 100.

Figure 2:
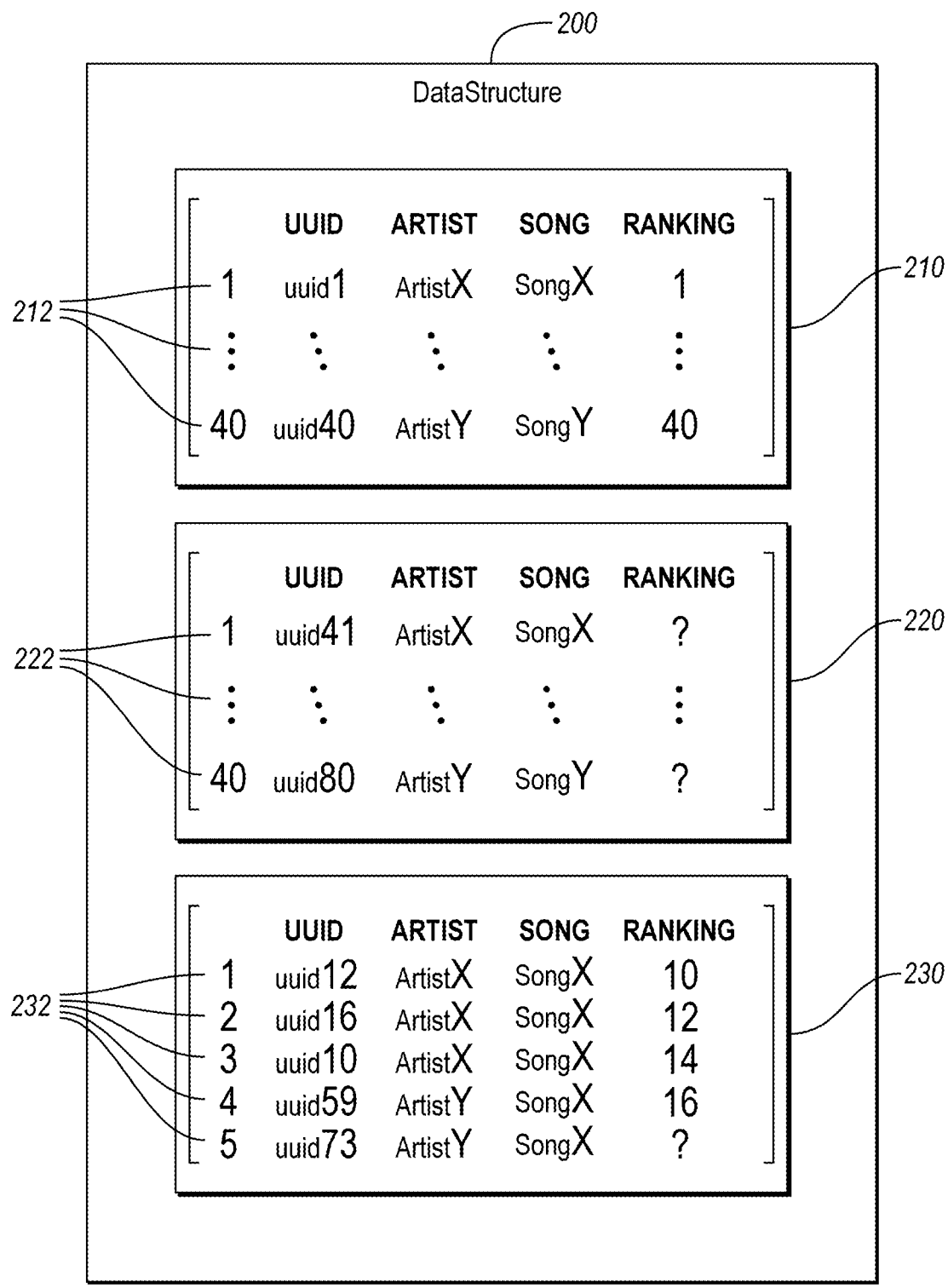
FIG. 2 is a data schema for storing a first or second digital register and a digital user ranking.

Referring to FIG. 2, a portion of a data structure 200 is shown. The data structure includes an efficient storage mechanism for storing digital user rankings 230 and digital registers 210, 220 of digital content items 212, 222, 232. The digital content items 212, 222 may be assigned to rows each having a unique identifier and other digital content item 212, 222 information. The ranked digital register 210 may include a variety of ranked digital content items 212 taken from a digital content repository. The repository may be located on the third-party fingerprinting service server 130. The digital content repository may be located on the data store of the backend server 120. The ranked digital register 210 may look like schema 1, below.

$$\begin{bmatrix} & UUID & ARTIST & SONG & RANKING \\ 1 & uuid1 & ArtistX & SongX & 1 \\ \vdots & \ddots & \ddots & \ddots & \vdots \\ 40 & uuid40 & ArtistY & SongY & 40 \end{bmatrix} \quad (1)$$

In order to sort the ranked digital register 210, the items may be bucket sorted, bubble sorted, insertion sorted, selection sorted, heap sorted, or most preferably merge sorted. The digital content items 212 may be arranged for selection by the user of the mobile device 100. The digital content items 212 may be arranged in the digital register 210 in a variety of ways. The digital content items 212 may be ranked according to popularity. The popularity index may be localized to the region or association of the user of the mobile device 100. For example, the ranked digital register 210 may be formed based on the local popularity of the digital content item 212. The digital content item 212 may be a song, book, movie, streamed media, music video, or other created content available in a digital form. The ranking may also take into consideration hardcopy or paper forms of the digital content items. The popularity index may incorporate or consist of a public popularity index (e.g., Nielsen®).

The data structure 200 may include an unranked digital register 220. The unranked digital register 220 may include unranked digital content items 222. The unranked digital content items may be selected from a variety of sources. The unranked digital content item 222 may be associated with the user of the mobile device 100. The unranked digital content item 222 may be promoted by a local radio station or part of an association related to the user of the mobile device 100. The unranked digital register 220 may be similar to schema 2, as shown below. As shown, the unranked digital content items 220 have different unique identifiers (UUIDs) than the ranked digital content items. The digital content items 212, 222 of the ranked and unranked digital registers 210, 220 may have little or no intersection.

$$\begin{bmatrix} & UUID & ARTIST & SONG & RANKING \\ 1 & uuid41 & ArtistX & SongX & ? \\ \vdots & \ddots & \ddots & \ddots & \vdots \\ 40 & uuid80 & ArtistY & SongY & ? \end{bmatrix} \quad (2)$$

The data structure 200 may include a digital user ranking 230 including selected digital content items 232. The selected digital content items 232 may be selected from at least one of the ranked and unranked digital registers 210, 220. The selected digital content items 232 may be tracked to determine the top score of the players in the game. The digital user ranking 230 or a portion thereof may be sent to the backend server 120. For example, the UUIDs associated with the selected digital content items 232 may be sent to the backend server. In another embodiment, activity tracking data associated with selected digital content items 232 may be sent to the mobile device 100 for tabulation thereby reducing the processing and memory required to obtain a score. The digital user ranking may be similar to schema 3, as shown below. Portions of the data structure 200 may be located on the backend server 120, mobile device 100, or third-party server 130.

$$\begin{bmatrix} & UUID & ARTIST & SONG & RANKING \\ 1 & uuid12 & ArtistX & SongX & 10 \\ 2 & uuid16 & ArtistX & SongY & 12 \\ 3 & uuid10 & ArtistX & SongZ & 14 \\ 4 & uuid59 & ArtistY & SongX & 16 \\ 5 & uuid73 & ArtistY & SongY & ? \end{bmatrix} \quad (3)$$

The data structure 200 may further include an activity tracking schema to track activity associated with each digital content item UUID. The activity tracking schema may include competition starting date ranking and accumulators for each of the activity tracking genres and each of the digital user rankings 230. For example, the activity tracking schema may include a column for tracking the promotions a user has made for each selected digital content item 232 on the digital user ranking 230.

The data structure 200 may further include demographic tracking information related to the user, contest, association, digital content creator, digital content items, or other information of interest. The data structure 200 may track what associations are promoting a digital content item or determine song preferences of a user.

Figure 3:
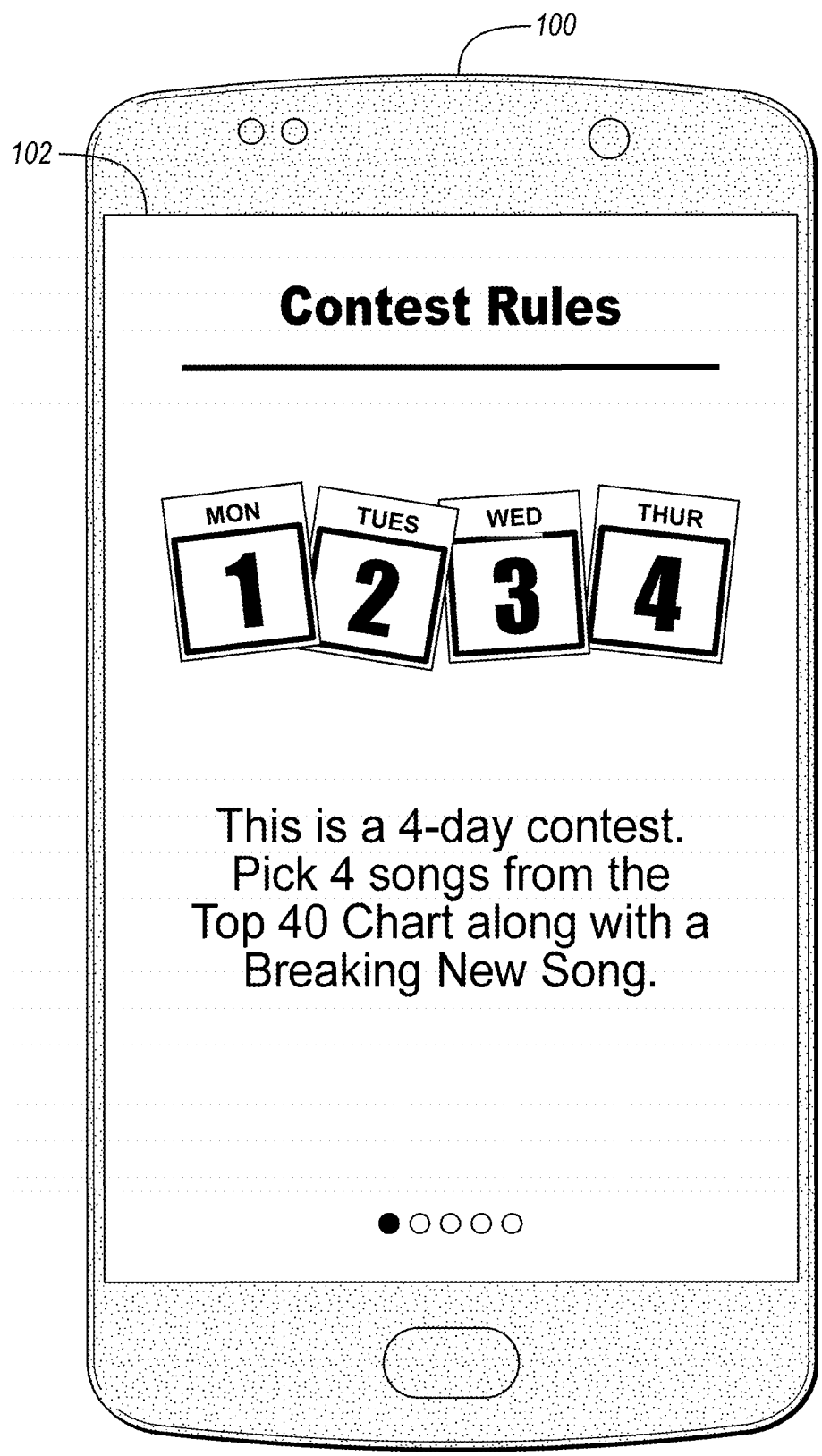
FIG. 3 is a computer graphical user interface (GUI) for a game having a four-day contest.

Referring to FIG. 3, a computer graphical user-interface (GUI) for the game is shown. The splash screen is displayed on the GUI 102 of the mobile device 100. The splash screen may define the game to be played. The game to be played may be a four-day contest organized by a radio station. The contest may include a selection of four ranked digital content items 212 from the ranked digital content register 210 and one unranked digital content item 222 from the unranked digital content register 220. The contest may be any length of time or be based on other factors (e.g., point total accumulation). The contest may vary by location and contest.

Figure 4:
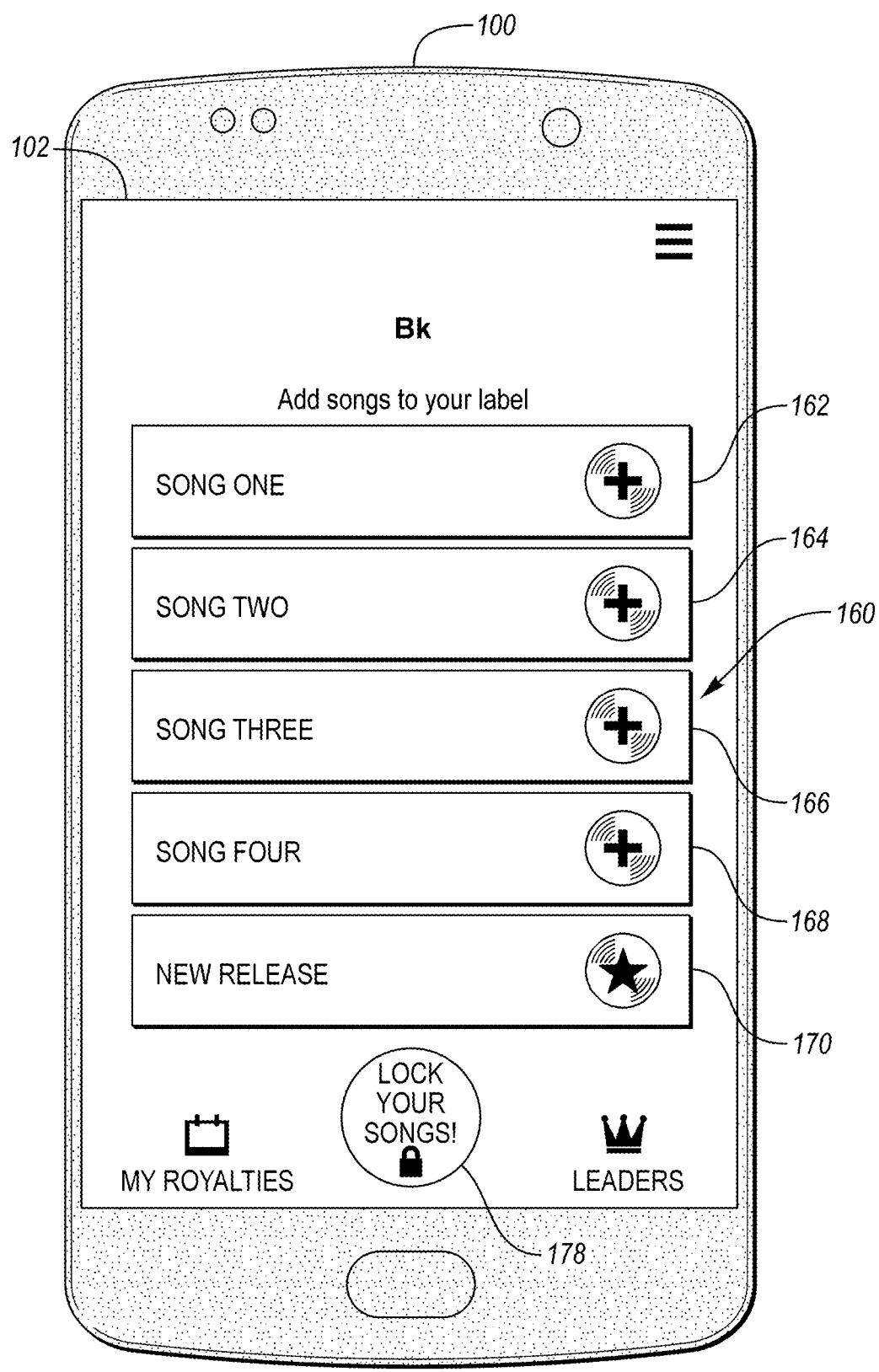
FIG. 4 is a GUI including a selection screen for a digital user ranking of a digital register.
Figure 5:
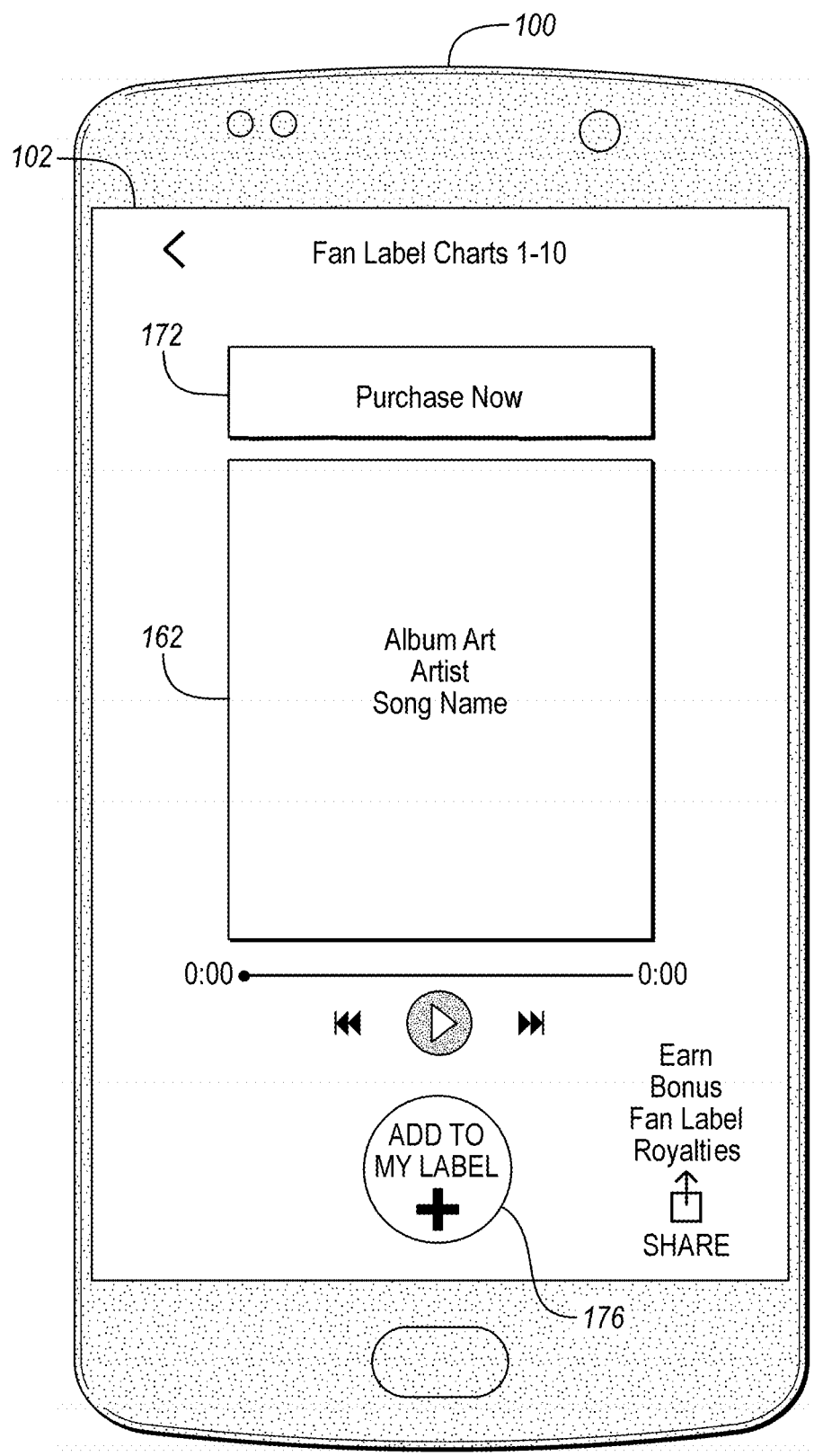
FIG. 5 is a GUI including a selection screen of a digital content item from a digital register.
Figure 6:
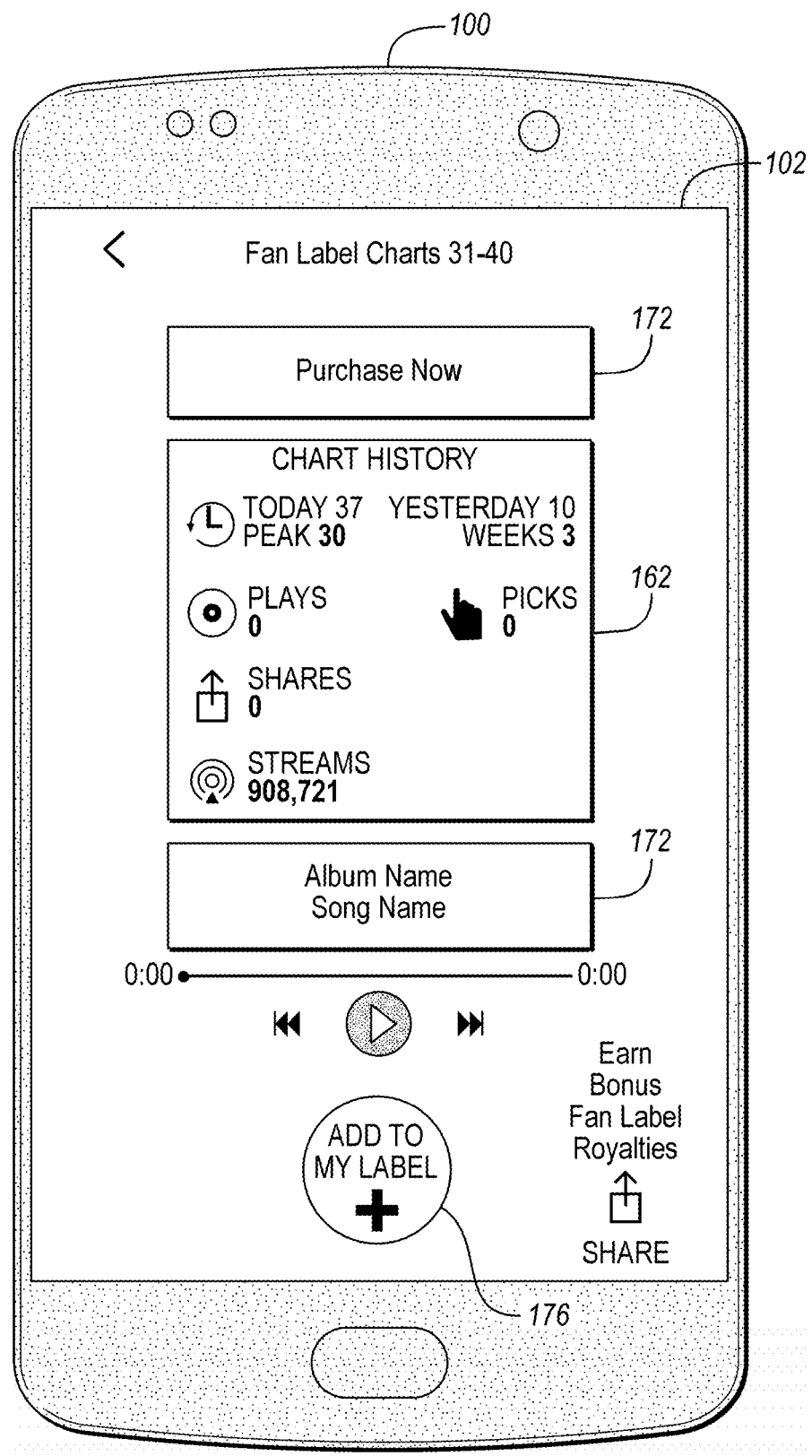
FIG. 6 is a GUI including a selection screen of a digital content item from a digital register.
Figure 7:
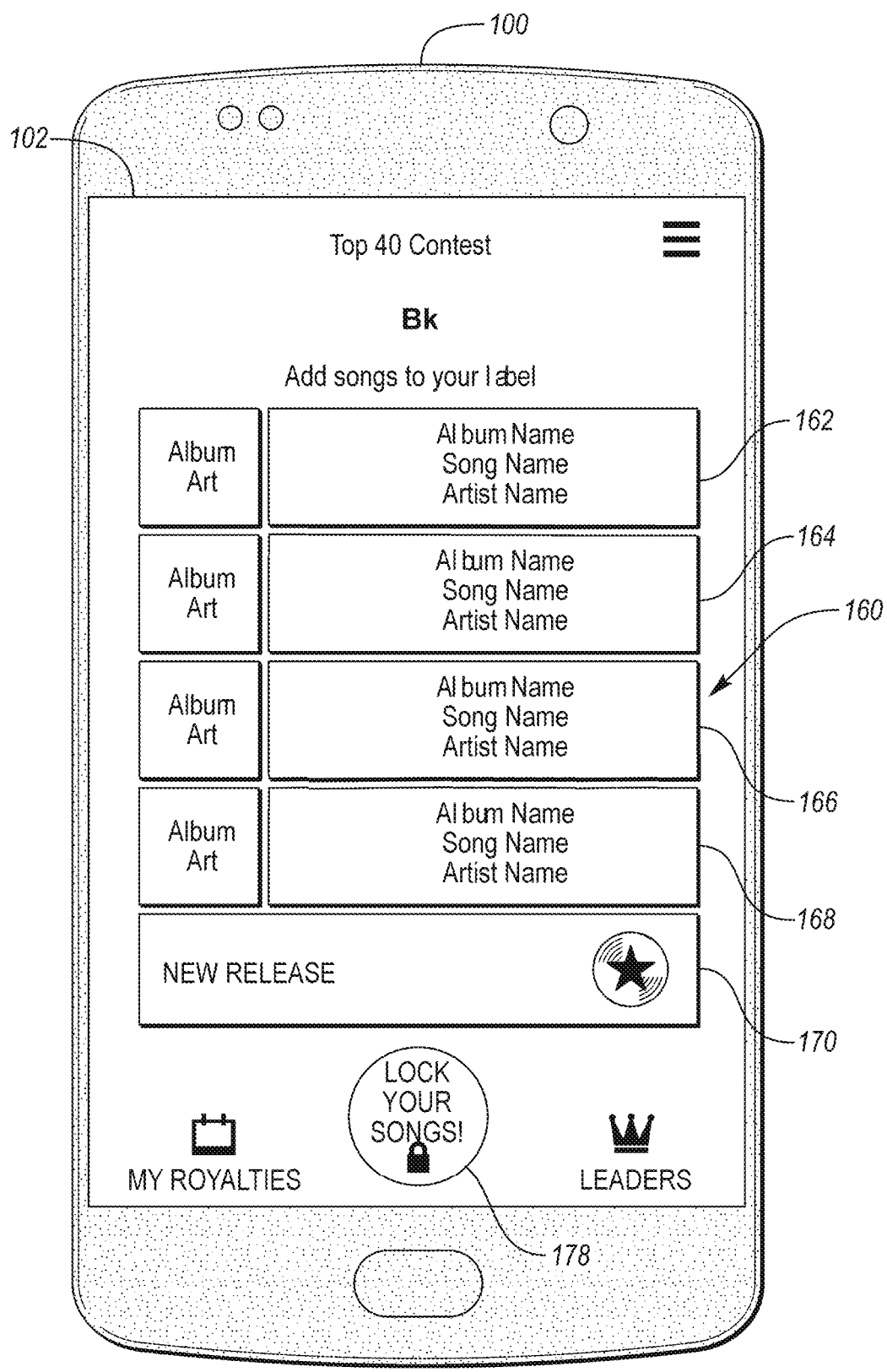
FIG. 7 is a GUI of a digital user ranking for a game.
Figure 8:
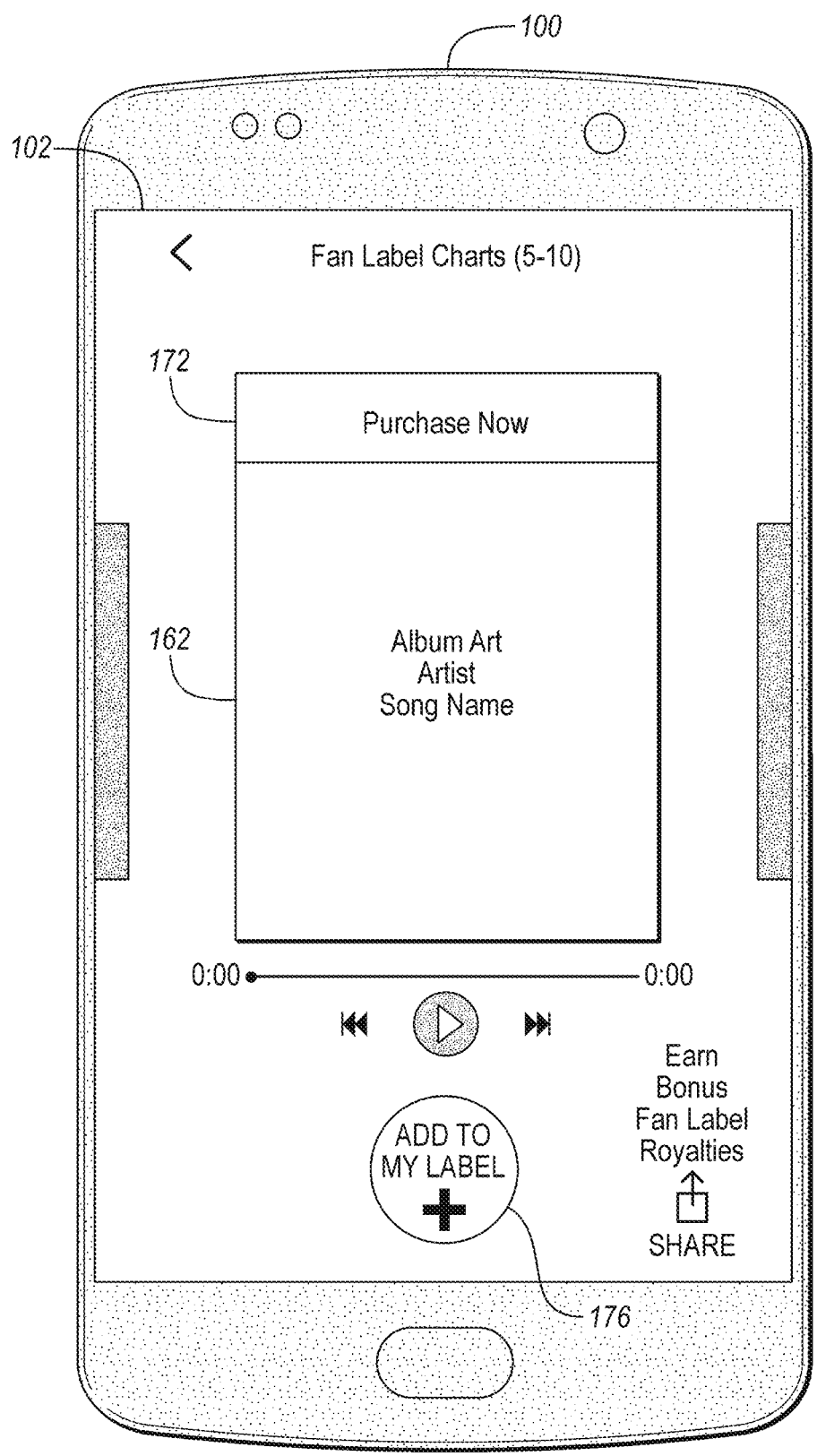
FIG. 8 is a GUI display of an uncharted digital content item of an uncharted digital register.

Referring to FIG. 4, a mobile device 100 having a GUI 102 is shown. The GUI includes a digital content item selection screen 160 of a software application. The digital content selection screen 160 includes a number of selection prompts 162, 164, 166, 168, 170 operable to enable a user to select from a ranked digital content register 210 and an unranked digital content register 220. The score may be viewed by the "my royalties" button. The overall game score may be viewed with the "leaders" button. The user may select the digital content items 212, 222 and proceed to "lock" 178 a selection before the game is started.

Figure 9:
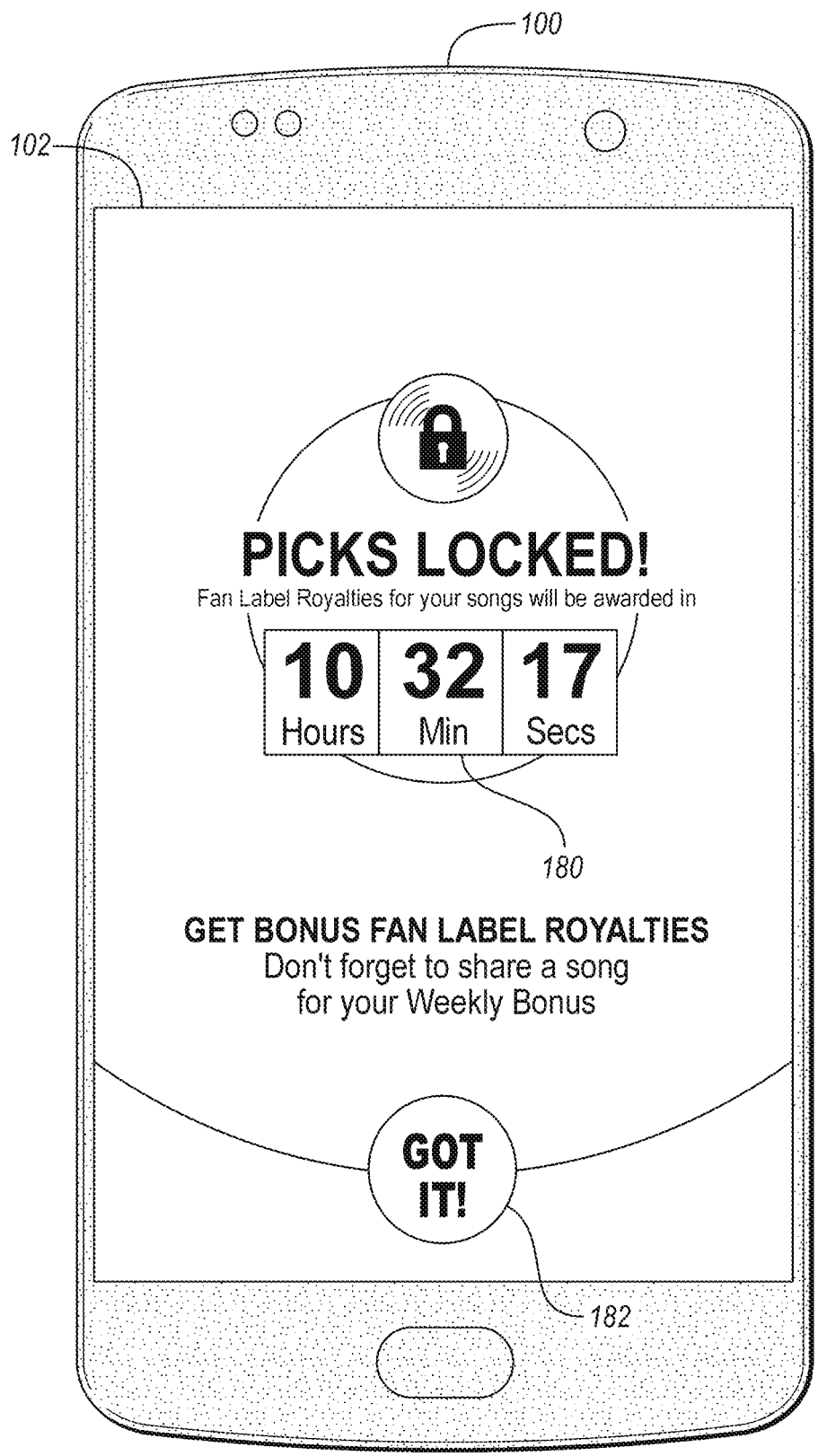
FIG. 9 is a GUI including a selection lock screen and game timer countdown screen.

Referring to FIGS. 5-8, GUIs of the ranked digital register 210 and unranked digital register 220 are shown. The mobile device 100 includes a GUI 102. The GUI 102 includes scrollable prompts 162, 164, 166, 168, 170 for selecting a ranked digital content item 212 and an unranked digital content item 222. Additional information related to the digital content item 212 is selectively shown through button 162. The user is also prompted to purchase a digital content item with button 172. Button 176 allows the user to add the ranked digital content items 212, 222 to the selection. After the digital content items 212, 220 are selected, the user may use button 178 to select in the digital content items 212, 222, which adds the items 212, 222 to the digital user ranking 230. Referring to FIG. 9, a splash screen is shown on the GUI 102 of the mobile device 100. The splash screen indicates the time remaining in the contest 180 and a confirmation button 182.

Figure 10:
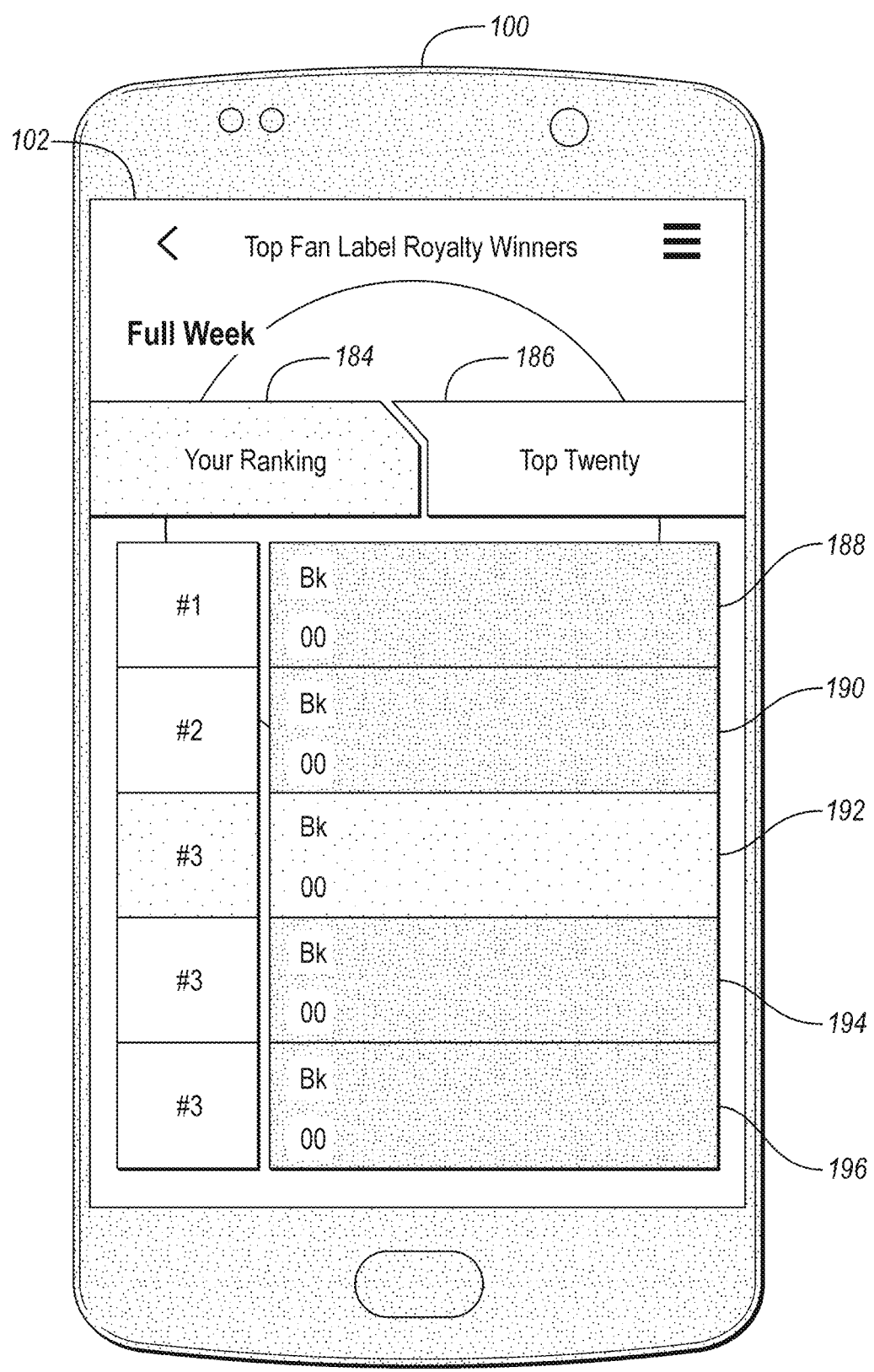
FIG. 10 is a GUI including a scoreboard of a digital user ranking.

Referring to FIG. 10 a list of points 188, 190, 192, 194, 196 associated with digital user rankings 230 is shown on the GUI 102 of the mobile device 100. The contest may have numerous digital user rankings 230 from various participants, as shown through each of the point accumulators 188, 190, 192, 194, 196 related to each of the digital user rankings 230. The list is sorted such that the digital user ranking 230 having the highest number of accumulated points 188, 190, 192, 194, 196 is shown. The points are accumulated through activity tracking. The user may select to display a personal ranking 184 or the top twenty digital user rankings 230 through button 186. In some embodiments, the scores 188, 190, 192, 194, 196 may be shown as ticker tape across a top or bottom portion of the GUI 102.

Figure 11:
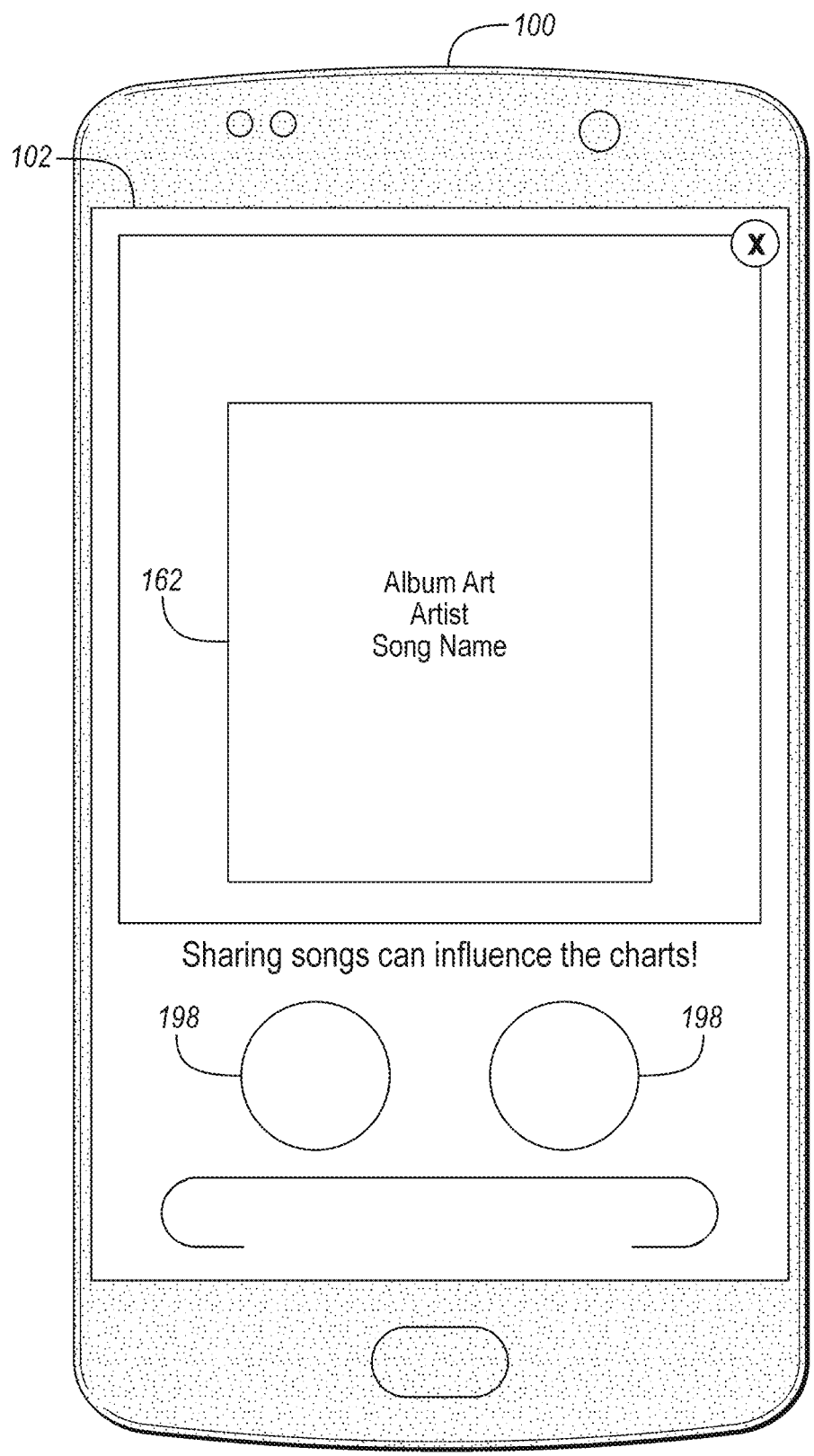
FIG. 11 is a GUI including a promotion screen of a digital content item associated with a digital user ranking.

Referring to FIG. 11, the user may promote or share a selected digital content item 232 associated with the digital user ranking 230 through a similar interface on the GUI 102 of the mobile device 100. A prompt 162 including information associated with the selected digital content item 232. The user is then prompted to promote the selected digital content item 232 through buttons 198 connecting the content to a network. Promotion may be considered an activity tracking parameter that increases a score 188, 190, 192, 194, 196 associated with the user's digital user ranking 230.

Figure 12:
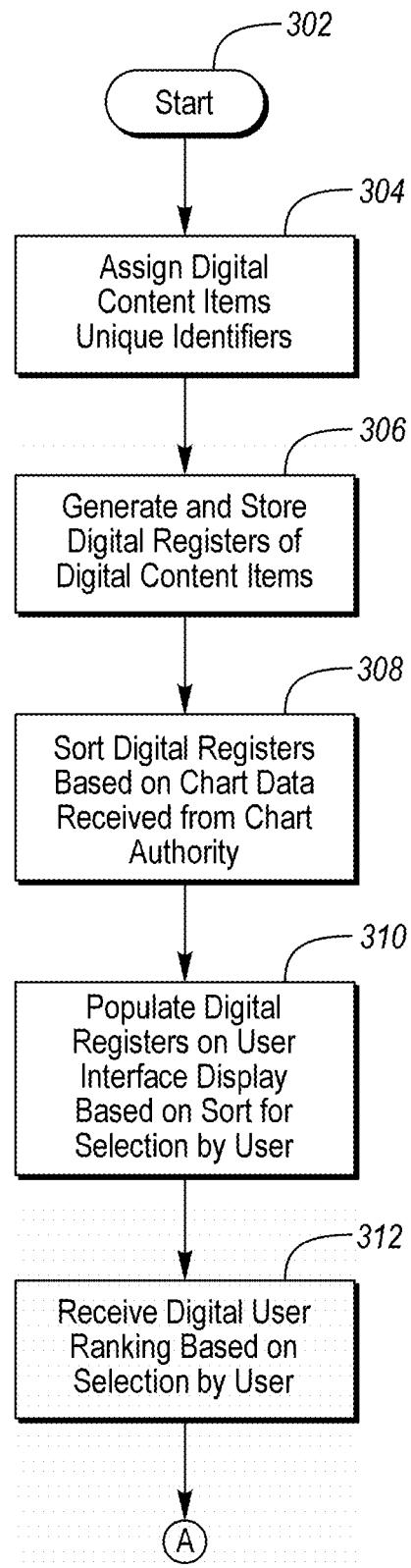
FIG. 12 is a portion of a flow diagram for an improved game scoring computer system.
Figure 13:
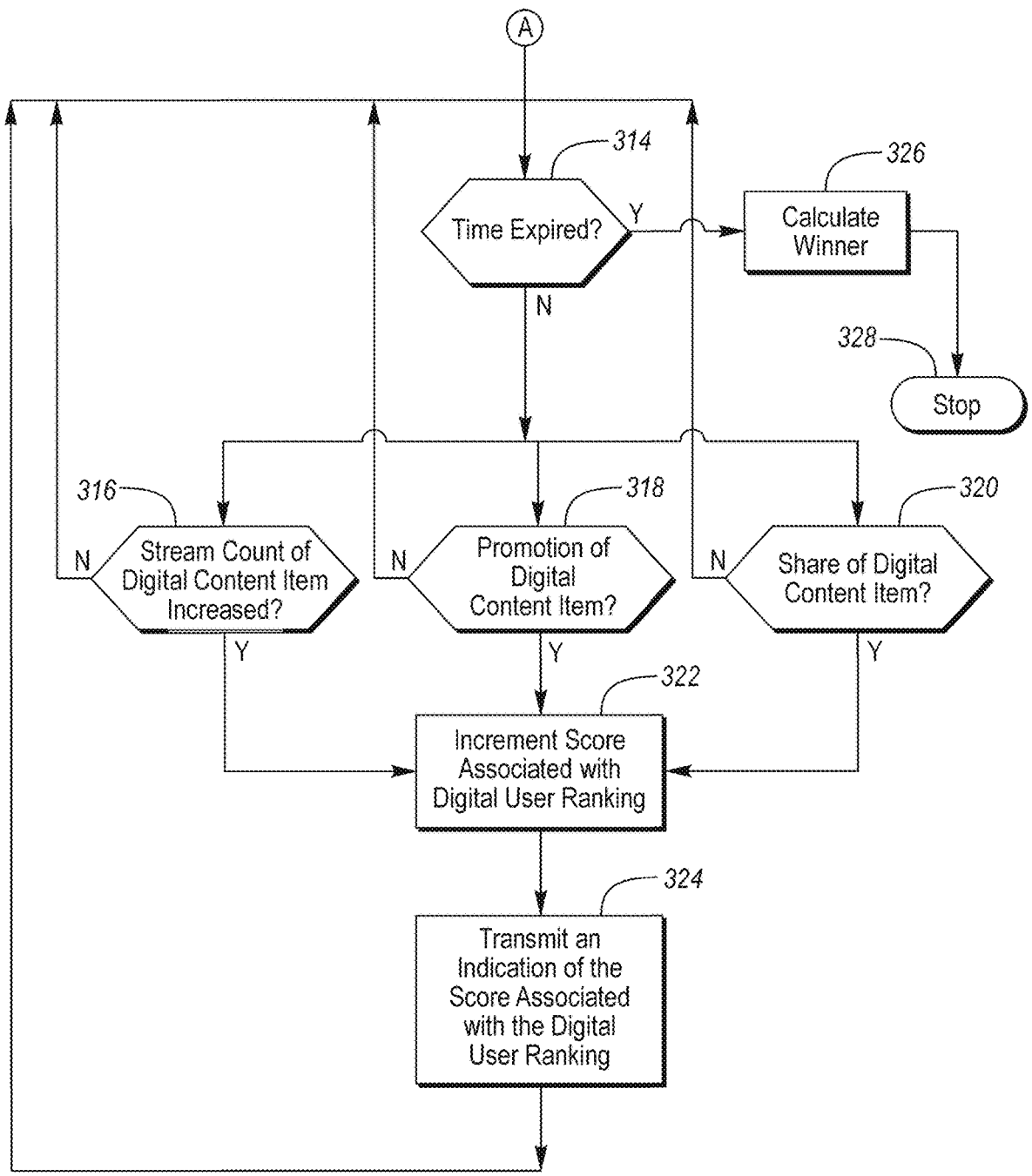
FIG. 13 is a portion of a flow diagram for an improved game scoring computer system.

Referring to FIGS. 12 and 13, a flow diagram 300 of a game is shown. In step 302 the algorithm begins. In step 304, the digital content items 212, 222 are assigned unique identifiers. The unit identifiers may be assigned through a hashing algorithm (e.g., MD5) to uniquely identify each digital content item 212, 222 for selection. The unique identifier may include a portion to signify an original or derivative work.

In step 306, the ranked and unranked digital registers 210, 220 are generated and stored. The ranked digital register 210 is generated based on popularity or other factors. Nielsen® charts and chart positions may be used. The chart position or ranking may indicate a statistical approval rating of the digital content item 232. The chart position or ranking may be defined at a national, state, or local level. Local popularity indexes based on streams in particular regions or associations may be used. For example, the streams belonging to a particular university may be aggregated and assigned to a ranking. The unranked digital register 220 may be generated based on the user or other factors. For instance, the unranked digital register 220 may be created by a local radio station or a college club.

In step 308 the digital registers are sorted and stored by the ranking. The sorting may be performed using various methods. For instance, a merge sort may be used to streamline the sorting process at the mobile device 100. In step 310, the digital registers 210, 220 are populated on the mobile device GUI 102. In step 312, the user selects the digital user ranking 230 by identifying ranked and unranked digital content items 212, 222.

In step 314, the mobile device 100 or backend server 120 determines whether the contest timer has expired. If the timer has not expired an activity tracking algorithm is initiated to determine total points is assigned to each selected digital content item 232 selected in the digital user ranking 230. For example, a score associated with the selected digital content item 232 of the digital user ranking is incremented, in step 322, if the stream count of the selected digital content item 232 has increased, in step 316. Periodic polling of streaming services may be performed to determine the number of streams of the selected digital content item 232. In step 318, if the user has promoted the digital content item 318, the score associated with the digital user ranking is increased in step 322. In step 320, if the user has shared the digital content item, the score associated with the digital user ranking is increased in step 322. For example, the user may use a peer-based sharing service to share the selected digital content item 232 with friends on social media. In step 324, an indication of the score associated with the digital user ranking is transmitted or displayed on the mobile device 100.

The score associated with the digital user ranking may also include a risk factor. The risk factor may proportionately or disproportionately change the points assigned to each score based on a likelihood of success of the digital content item 212, 222 selection. The risk associated with each digital content item 212, 222 may be displayed next to the item 212, 222 during the selection process. The risk may be based on a trend of the digital content items 212, 222 popularity. For example, a song that is losing popularity may be associated with a higher risk, providing greater reward to the user who includes the song in their digital user ranking 230.

In one or more embodiments, the data structure may employ a tiered reward schema based on the risk factor for accessing and managing a tiered incentive program. The tiered schema may coordinate with the competition schema to issue/award rewards. The tiered schema may include a plurality of tiered rewards such that the rewards issued to a user may depend on their status (i.e., which tier the user is affiliated with). In a refinement, rewards awarded (e.g., points) to first tier users (and their respective virtual music label) and/or contestants may be greater than rewards awarded (e.g., points) to second tier users and/or contestants.

For example, a user (or group of users) may be rendered a first-tier status for one or more activities such as introducing or adding a new digital content item (e.g., song, album, artist, and/or music video) to the platform and selecting it in a contest. Another user (or group of users) may be rendered a second-tier status for one or more different activities such as selecting the newly introduced digital content item in a contest within its first 500 streams such as on the platform. In another example, a third user (or third group of users) may be rendered a third-tier status for one or more activities such as selecting the newly introduced digital content item within the first 500-2500 streams.

If the contest time has expired, in step 314, the backend server 120 or mobile device 100 will calculate a total score of each of the digital user rankings in the contest. The highest score is then submitted as the winner. In step 328 the game is stopped.

Figure 14:
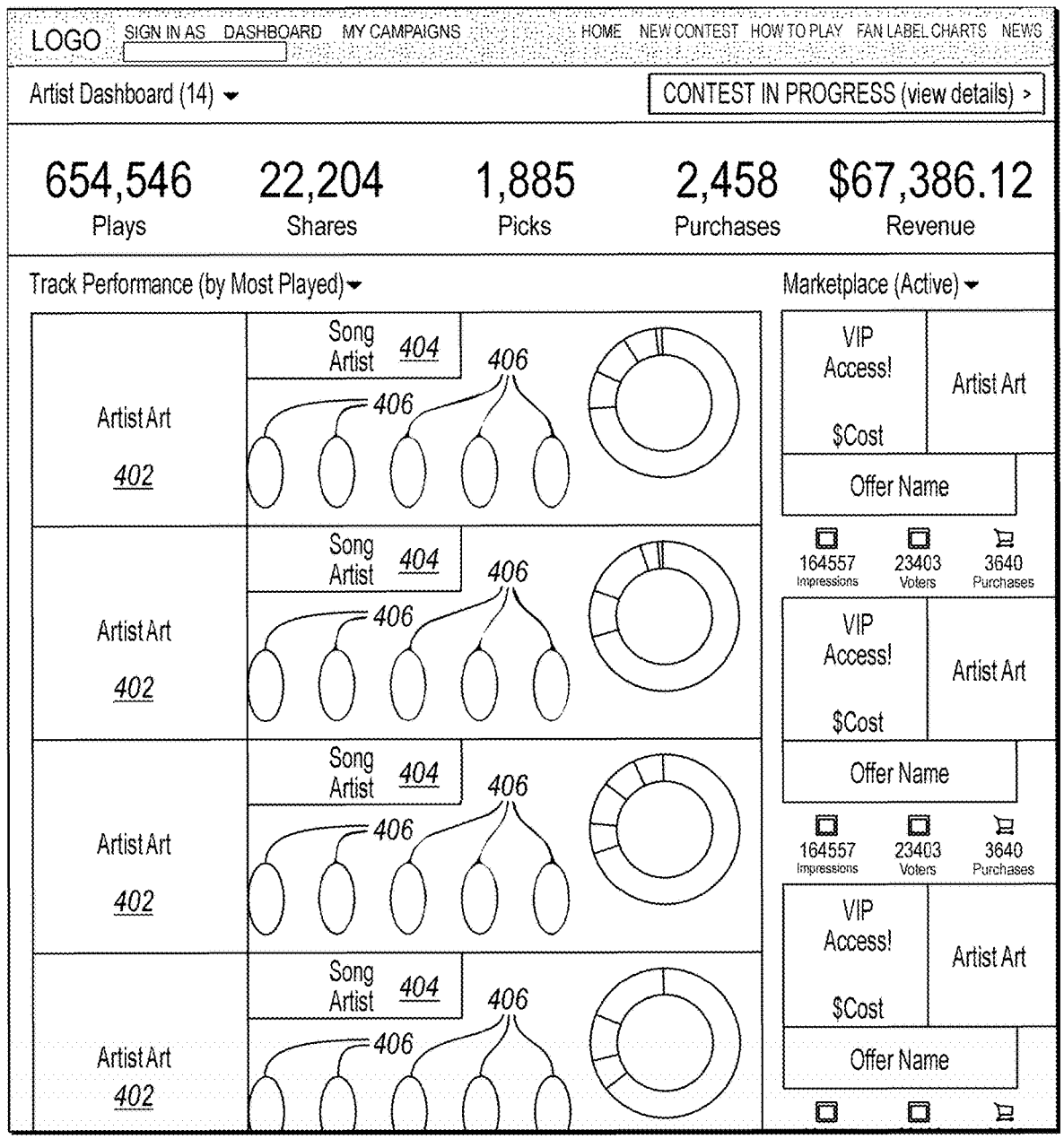
FIG. 14 is a display screen of a GUI including a digital content item creator marketplace.
Figure 15:
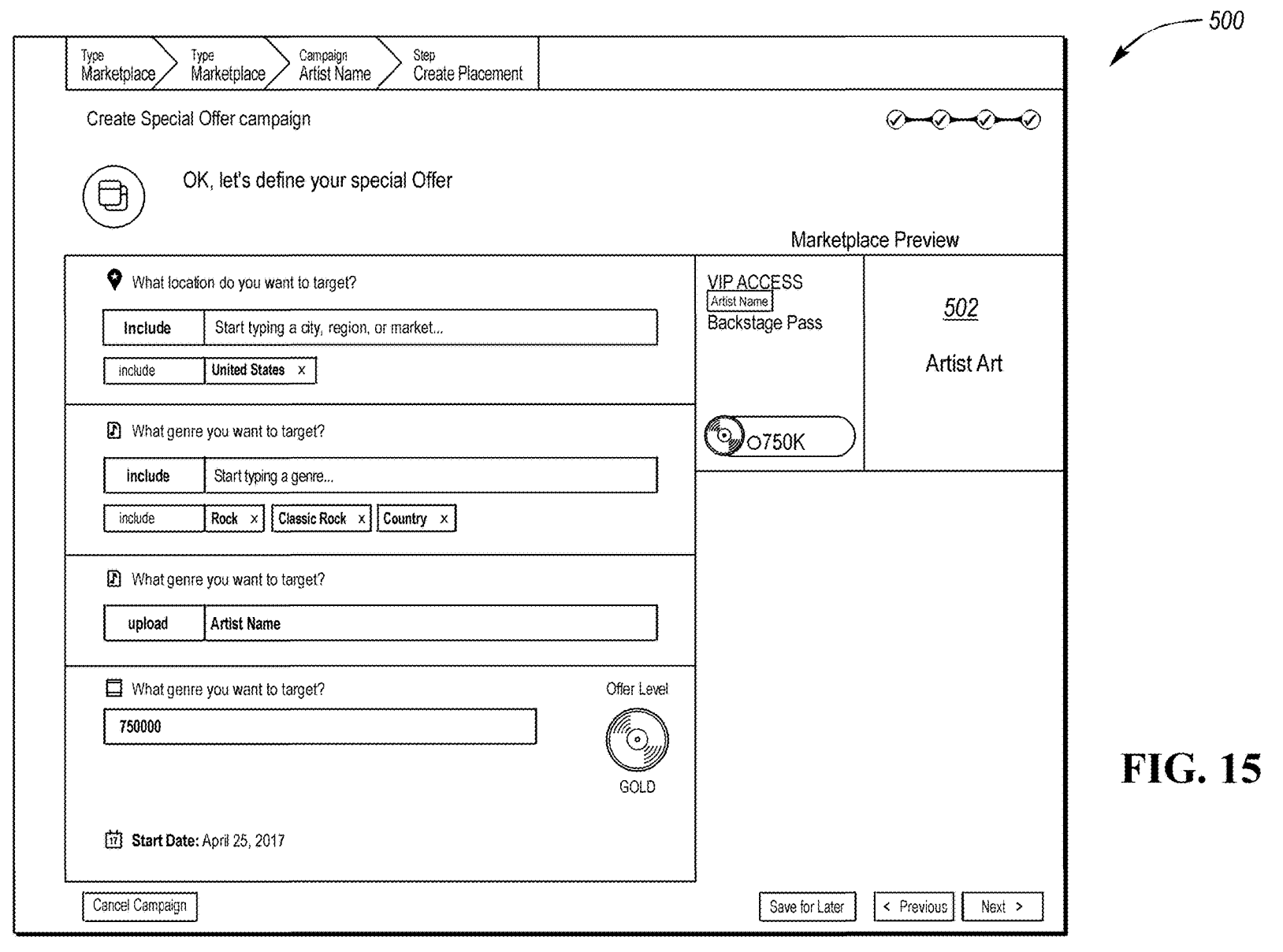

Referring to FIGS. 14 and 15, GUIs 400, 500 for a marketplace of an incentivized electronic platform is shown. The marketplace includes a dashboard that highlights a digital content creator's activity tracking parameters and other information over time. The dashboard may include information related to particular contests, including rewards, promotions, purchases, impressions, views, shares, contests, and other information. The dashboard may include information related to each of a digital content creator's songs. The dashboard may allow a digital content creator to target particular locations, associations, musical genres, or other contest relevant parameters. The digital content creator may award offerings (e.g., backstage passes, digital content items) to any participant that reaches activity tracking parameter points associated with the particular digital content creator above a predetermined threshold. In a refinement, each user and/or their virtual music label/record may be identified by an ID. For instance, a music artist may give a backstage pass to any contestant/label that reaches a score of 750,000 activity tracking points related specifically to that music artist. The contestant/label may select that artist's songs, promote those songs, share those songs on social media or use other methods to obtain points related to that artist.

The points rewarded in a contest may also accumulate outside of that individual contest in an overall competition. For example, a user and/or music label profile may be rewarded 50 points in a first contest by making a first selection of a digital content item (e.g., a song, album, artist, and/or music video) from a first digital registry and a 150 (additional) points in a second contest by making a second selection of a digital content item (e.g., a song, album, artist, and/or music video) from a second digital registry for a total points (i.e., a cumulative score) of 200 points which may be used for upgrades and/or award offerings for the user and/or music label profile. In a refinement, the first and second registries may be different such that the first and second selections are for different digital content items. In another example, the user may enter a tournament and be ranked second place in the tournament based on being rewarded 1,200 points throughout the tournament. The 1,200 points may also be added to the cumulative score for a total points of 1,400 such that the user's music label profile is also ranked based on his/her overall score amongst all the users. In a refinement, an indication of the cumulative score, cumulative score(s), and/or the ranking may be displayed, for example, via the application on the user transceiver.

In a variation, the data structure may receive a plurality of digital record labels. Each label may correspond to a user and/or their corresponding user transceiver. In a contest and/or tournament, the label may include a plurality of digital content items (e.g., albums, songs, and/or artist) selected from one or more digital registries. In a refinement, the user may select the digital content items via the user transceiver. The label may then be assigned points after initiating an activity tracking algorithm based on one or more activity tracking parameters and the tiered reward schema. For example, a first user may receive a first number of points based on the one or more activity tracking parameters associated with a newly introduced digital content item; a first group of users that selects or adds the newly added digital content item may receive a second number of points based on the same activity tracking parameters; and a second group of users that add or select the newly added digital content item may receive a third number of points based on the same activity tracking parameters. The first, second, and third number of points being different from each other. In a refinement, the first number of points may be greater than the second number of points, and the second number of points may be different than the third number of points.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A data structure embodied on a computer-readable non-transitory medium having a database schema for arranging a competition among associated users in a structured query language (SQL) database, the database schema comprising:
   a grouping schema identifying one or more associated contestants, the grouping schema receiving one or more inputs from a host contestant to identify and associate the one or more associated contestants;
   a competition schema including a plurality of contests, each contest having relational data tables configured to:
      receive selections of songs, albums, and/or artists from the contestants; and
      reward points to each contestant based on their corresponding selections, a sum of the points for each contestant being accumulated to determine a contestant score, the rewarded points being based on one or more activity tracking parameters; and
   an application configured to access and manage the contestants, the selections, the one or more activity tracking parameters, and scores for each contestant in the SQL database.

2. The data structure of claim 1, wherein the activity tracking parameters include at least one of a stream count, popularity, impressions, views, contestant promotions, shares, and purchases.

3. An incentivized electronic platform comprising:
   at least one processor including a computer having a central processing unit (CPU) for executing machine instructions and a memory for storing machine instructions that are to be executed by the CPU, the machine instructions when executed by the CPU implement the following logic:
      transmit one or more invitation notifications for a competition to one or more user transceivers such that one or more users join the competition as contestants;
      transmit contests to the one or more user transceivers of the contestants such that the contestants may each select a song, album, and/or artist for each contest on the one or more user transceivers;
      receiving selections from the contests by the contestants via the one or more user transceivers;
      rewarding points to each of the contestants based on their corresponding selections to determine a score for each of the contestants; and
      ranking the contestants based the score.

4. The incentivized electronic platform of claim 3, wherein transmission of the invitation notifications is initiated by a host contestant identifying the one or more contestants.

5. The incentivized electronic platform of claim 4, wherein the contestants are displayed and ranked by score on a leaderboard screen accessible via the one or more user transceivers.

6. The incentivized electronic platform of claim 5, wherein the contests are displayed on a lobby screen associated with the competition.

7. The incentivized electronic platform of claim 6, wherein the lobby screen includes an activity record of contestant activities within the competition.

8. The incentivized electronic platform of claim 6, wherein the lobby screen includes a contest timer countdown displaying a time remaining in the competition.

9. The incentivized electronic platform of claim 3, wherein the competition is identified by a unique competition code such that an unassociated user may join the competition as a contestant using the unique competition code.

10. The incentivized electronic platform of claim 3, wherein the competition has a start time, and the score is zero for each of the contestants at the start time and accumulates thereafter.

11. The incentivized electronic platform of claim 3, wherein the points are rewarded according to an activity tracking algorithm.

12. An incentivized electronic platform comprising:
at least one processor including a computer having a central processing unit (CPU) for executing machine instructions and a memory for storing machine instructions that are to be executed by the CPU, the machine instructions when executed by the CPU implement the following logic:
receive a prompt from a host contestant to initiate a competition;
transmit a screen to the host contestant for receiving competition information;
receive contestant information for identifying one or more contestants; and
transmit a competition invite and/or unique competition code to the one or more contestants such that the contestants join the competition.

13. The incentivized electronic platform of claim 10, wherein the prompt is a digital button.

14. The incentivized electronic platform of claim 10, wherein the competition information includes a start date and a duration.

15. The incentivized electronic platform of claim 12, wherein the competition information includes a competition prize.

16. An incentivized electronic platform comprising:
a processor including a computer having a central processing unit (CPU) for executing machine instructions and a memory for storing the machine instructions, the machine instructions when executed perform the following functions:
a) generate a music label profile for a user, the music label profile having a cumulative score;
b) transmit a screen for displaying a plurality of contests to a mobile device of the user;
c) transmit, to the mobile device, a selection screen for displaying a number of selection prompts corresponding to a digital register, the selection prompts representing songs, albums, and/or artists;
d) receive, via the mobile device, a selection representing a song, album, and/or artist from the selection screen; and
e) rewarding points based on the selection and adding the points to the cumulative score of the music label profile.

17. The incentivized electronic platform of claim 16, wherein the selection represents a song.

18. The incentivized electronic platform of claim 16, further comprising (e) transmitting, to the mobile device, a second selection screen corresponding to a second contest of the plurality of contest; (f) receiving a second selection representing a different song, album, and/or artist, via the mobile device; and (g) rewarding additional points based on the second selection representing a different song, album, and/or artist from the selection screen and adding the additional points to the cumulative score of the music label profile.

19. The incentivized electronic platform of claim 16, wherein an indication of the cumulative score is displayed.

20. The incentivized electronic platform of claim 18, wherein the first and second selections represent songs.

* * * * *